US008165726B2

(12) United States Patent
Nordberg et al.

(10) Patent No.: US 8,165,726 B2
(45) Date of Patent: Apr. 24, 2012

(54) WATER HEATER ENERGY SAVINGS ALGORITHM FOR REDUCING COLD WATER COMPLAINTS (75) Inventors: Timothy J. Nordberg, Plymouth, MN (US); Sybrandus B. V. Munsterhuis, Dalen (NL); Donald J. Kasprzyk, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/342,752

(22) Filed: Jan. 30, 2006

(65) Prior Publication Data

US 2007/0179678 A1 Aug. 2, 2007

(51) Int. Cl.
*G05D 23/00* (2006.01)

(52) U.S. Cl. .................. 700/300; 122/13.01; 122/14.2; 219/483; 432/36

(58) Field of Classification Search .................. 700/299, 700/300; 219/497, 483, 490, 509; 432/36, 432/44; 236/20 R, 91
See application file for complete search history.

(56) References Cited

U.S. PATENT DOCUMENTS

| 4,333,002 | A |   | 6/1982  | Kozak ............................ 219/321 |
| 4,508,261 | A |   | 4/1985  | Blank .......................... 236/20 R |
| 4,511,790 | A |   | 4/1985  | Kozak ............................ 219/486 |
| 4,588,875 | A |   | 5/1986  | Kozak et al. .................... 219/485 |
| 4,696,639 | A |   | 9/1987  | Bohan, Jr. ........................ 431/59 |
| 4,734,658 | A |   | 3/1988  | Bohan, Jr. ..................... 331/117 |
| 4,770,629 | A |   | 9/1988  | Bohan, Jr. ........................ 431/59 |
| 4,834,284 | A |   | 5/1989  | Vandermeyden |
| 4,984,981 | A |   | 1/1991  | Pottebaum ....................... 431/80 |
| 4,986,468 | A |   | 1/1991  | Deisinger .................... 236/21 R |
| 5,056,712 | A | * | 10/1991 | Enck ............................ 236/20 R |
| 5,495,551 | A |   | 2/1996  | Robinson, Jr. et al. |
| 5,660,328 | A |   | 8/1997  | Momber ...................... 236/20 R |
| 5,797,358 | A |   | 8/1998  | Brandt et al. ............... 122/448.1 |
| 5,968,393 | A |   | 10/1999 | Demaline ..................... 219/492 |
| 6,059,195 | A |   | 5/2000  | Adams et al. ............... 236/20 R |
| 6,178,291 | B1 |  | 1/2001  | Zenios et al. |
| 6,261,087 | B1 |  | 7/2001  | Bird et al. ....................... 431/50 |
| 6,293,471 | B1 |  | 9/2001  | Stettin et al. ................ 236/20 R |
| 6,350,967 | B1 |  | 2/2002  | Scott .............................. 219/497 |

(Continued)

FOREIGN PATENT DOCUMENTS

GB 2211331 A 6/1989

OTHER PUBLICATIONS

M.H. Nehrir, 1998, IEEE, http://www.coe.montana.edu/ee/lameres/vitae/publications/d_conference_full/conf_full_004_demand_size_management.pdf.*

(Continued)

*Primary Examiner* — Kakali Chaki
*Assistant Examiner* — Nathan Laughlin
(74) *Attorney, Agent, or Firm* — McDonnell Boehnen Hulbert & Berghoff LLP (57) ABSTRACT

An energy savings water heater is described. The water heater is controlled by an energy savings algorithm that uses one or more of a variable setpoint differential, a variable setback threshold, additional setback thresholds, and an adjustable minimal setpoint to improve the operation of an energy efficient water heater. Additionally or alternatively, a different setback control algorithm may be used that obtains additional data to adjust the setpoint. As a result, the operating cost of the water heater is reduced, while minimizing user complaints of cold water.

1 Claim, 6 Drawing Sheets

U.S. PATENT DOCUMENTS

| | | | |
|---|---|---|---|
| RE37,745 E | 6/2002 | Brandt et al. | 122/14.2 |
| 6,560,409 B2 | 5/2003 | Troost, IV | |
| 6,955,301 B2 | 10/2005 | Munsterhuis | 236/20 |
| 6,959,876 B2 | 11/2005 | Chian et al. | 236/68 |
| 7,085,482 B2 * | 8/2006 | Renoud-Grappin | 392/478 |
| 7,221,862 B1 * | 5/2007 | Miller et al. | 392/498 |
| 7,380,522 B2 * | 6/2008 | Krell et al. | 122/14.2 |
| 2001/0009609 A1 | 7/2001 | Bradenbaugh | |
| 2001/0031138 A1 | 10/2001 | Troost, IV | 392/498 |
| 2002/0132202 A1 | 9/2002 | Clifford | 431/264 |
| 2004/0069768 A1 | 4/2004 | Patterson et al. | |
| 2007/0175883 A1 * | 8/2007 | Miu et al. | 219/400 |

OTHER PUBLICATIONS

Office Action mailed Jan. 22, 2009 for U.S. Appl. No. 10/911,151.

Office Action mailed Oct. 13, 2009 for U.S. Appl. No. 10/911,151.

* cited by examiner

WATER HEATER ENERGY SAVINGS ALGORITHM FOR REDUCING COLD WATER COMPLAINTS

FIELD

The present invention relates generally to water heaters, and more particularly, relates to an improved energy savings algorithm for water heaters.

BACKGROUND

Water heaters are used in homes, businesses, and just about any establishment having the need to heat water. Water heaters heat water using the simple "heat rises" principle. In operation, water heaters heat water entering near the bottom of the water heater to a desired temperature using a gas-fired burner, an electric heater, or some other form of energy.

During a heating cycle, the water at the bottom of the water heater becomes hotter and begins to rise towards the top of the water heater. Denser water on top of the water being heated falls toward the bottom of the water heater, which is then heated to the desired temperature. After the temperature of the water at the bottom of the water heater reaches a certain desired temperature, the water heater stops heating the water.

When demand for hot water occurs (e.g., someone turns on a faucet to run a shower), water enters the water heater and "pushes out" or supplies the hotter water near the top of the water heater. When enough of hot water exits from the top of the water heater, cold water enters at the bottom causing the temperature of the water at the bottom of the water heater to drop below the desired temperature. The water heater then repeats the heat cycling.

A water heater typically has at least one heating element or "heater," such as a gas-fired burner and/or electric heater. To take advantage of the "heat-rises" principle, the heater is located near the bottom of the water heater. Additionally, each water heater typically has at least one thermostat or controller for controlling the heater.

To facilitate the heating of water, the controller receives signals related to the temperature of the water. When these signals indicate that the water temperature is below a predetermined threshold, for example, when the water temperature is below 120 degrees Fahrenheit, the controller turns on the heater and the temperature of the water near the bottom of the water heater begins to rise.

After some time, the temperature of the water at the bottom of the water heater increases to a second threshold, which, for example, may be about 140 degrees Fahrenheit. When receiving signals indicating that the water temperature at the bottom of the tank is greater than the second threshold, the controller causes the heater to reduce its heat output or, alternatively, causes the heater to turn off. The heat cycle begins again when the temperature of the water at the bottom of the water heater drops below the first threshold.

Unfortunately, heating and maintaining hot water in the water heater can be expensive. To reduce operating costs, energy saving algorithms have been developed. These energy saving algorithms typically modify the inputs to the standard algorithm used by the controller to control the heat cycles of the water heater. While the user benefits from reduced operating costs, the tradeoff may be an undesirable cold shower.

Thus, it would be advantageous to have an energy savings algorithm that not only reduces the operating costs of a water heater, but also minimizes user complaints of cold water.

SUMMARY

An improved energy savings water heater control algorithm is described. In one example, a water heater system includes a tank containing water, a heater for heating the water in the tank, and a controller that adjusts a minimum setpoint of the heater as a function of a user setting. The minimum setpoint of the heater increases as the user setting increases. In one example, the controller adjusts the minimum setpoint of the heater to be approximately half way between a current user setting and a minimum user setting. In another example, the controller adjusts the minimum setpoint of the heater based on the following equation:

$$SP_{min} = Knob_{min} + (Knob_{current} - Knob_{min})/2$$

where $SP_{min}$ is the minimum setpoint; $Knob_{min}$ is the user's minimum setting; and $Knob_{current}$ is the user's current setting.

In another example, the water heater system includes a tank containing water, a heater for heating the water in the tank, a first sensor for detecting water temperature near a top of the tank, a second sensor for detecting water temperature near a bottom of the tank, and a controller that determines a temperature difference between a setpoint and an average of the water temperatures detected at the first and second sensors. The controller turns on the at least one heater if the temperature difference is greater than a setpoint differential. The setpoint differential is the difference between when the burner is turned on and off, and is a variable that is a function of the setpoint.

The variable setpoint differential is less for a lower setpoint. In one example, the variable setpoint differential is calculated based on the following formula:

$$SPD = SPD_{min} + (SP - SP_{min})/4 * K$$

where SPD is the setpoint differential; $SPD_{min}$ is the minimum setpoint differential; SP is the setpoint; $SP_{min}$ is the minimum setpoint; and K is a variable. K may be a value based on the setpoint differential increase per every three degrees of setpoint.

In another example, the water heater system includes a tank containing water, a heater for heating the water in the tank, a sensor for detecting water temperature near a top of the tank, and a controller that monitors the water temperature at the top of the tank using data from the sensor. The controller compares a drop in temperature to a variable setback threshold. The variable setback threshold is based on the current setpoint.

The setback threshold is reduced for a lower setpoint. In one example, the setback threshold may be calculated based on the following formula:

$$SBT = SBT_{min} + (SP - SP_{min})/K$$

where SBT is the setback threshold; $SBT_{min}$ is the minimum setback threshold; SP is the setpoint; $SP_{min}$ is the minimum setpoint; and K is a variable. K may be a value based on the setback threshold increase per every degree of setpoint.

In another example, the water heater system includes a tank containing water, a heater for heating the water in the tank, a sensor for detecting water temperature near a top of the tank, and a controller that monitors the water temperature at the top of the tank using data from the sensor. The controller compares a drop in the water temperature to at least two setback thresholds. Having at least two setback thresholds allows the controller to select one of three operating states for the heater. The three operating states are step up, step down, and unchanged.

In another example, the water heater system includes a tank containing water, a heater for heating the water in the tank, a first sensor for detecting water temperature near a top of the tank, a second sensor for detecting water temperature near a bottom of the tank, and a controller that obtains water temperature data from the first and second sensors to track minimum available hot water in the tank. Preferably, the controller tracks the minimum available hot water in the tank for at least a one day period. A setpoint is increased if the minimum available hot water drops below a first threshold. The setpoint is decreased if the minimum available hot water remains above a second threshold. The second threshold is greater than the first threshold.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
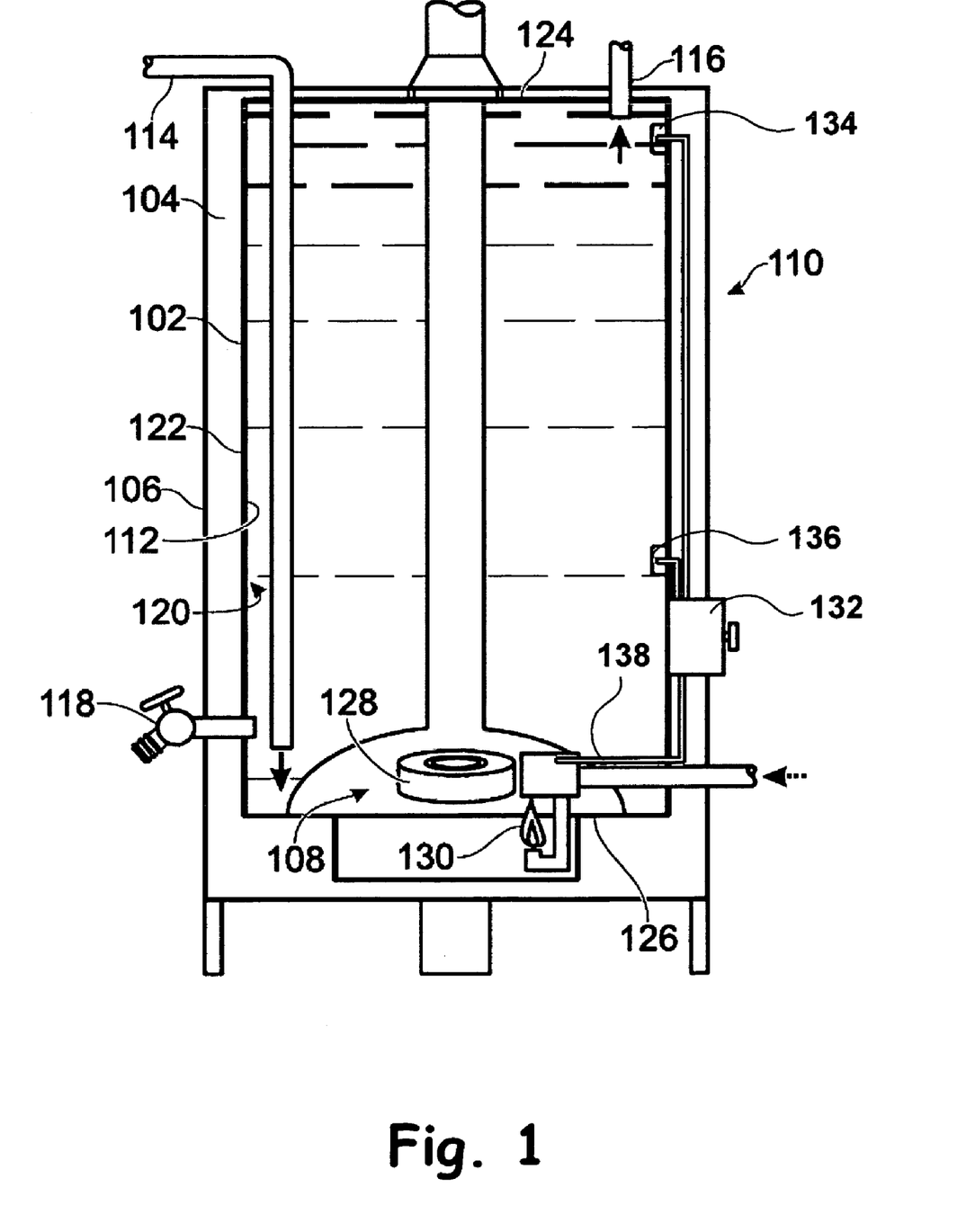
FIG. 1 is cutaway view of a water heater, according to an example.

The general operation of a water heater is described with respect to FIG. 1. This description provides context for the improvements to the energy savings algorithm described herein. While FIG. 1 depicts a gas-fired water heater, the energy savings algorithm is not limited to use in gas-fired water heaters. For example, the energy savings algorithm may also be used in an electric water heater.

Overview of Water Heater Operation

FIG. 1 is cutaway view of a water heater 110. The water heater 110 includes a tank 102, an insulating layer 104, an external shell 106, and a heater 108. The tank 102 holds water that is to be heated and may be constructed of steel or other heat conducting material. The tank 102 has an inner surface 112, an input supply tube or dip tube 114, an output conduit or pipe 116, a drainage valve 118, a rust inhibiting liner 120, and an outer surface 122.

The insulating layer 104 may be located between the outer surface 122 of the tank 102 and the external shell 106. The insulating layer 104 limits or otherwise minimizes heat loss of the heated water from passing from the tank 102 to the outside world. Bonded to the inside of the inner surface 112 is the rust inhibiting liner 120. In addition, the tank 102 may have a sacrificial anode rod (not shown) to keep the tank 102 from corroding.

The tank 102 also has a top surface 124 and bottom surface 126. Passing through the top surface 124 are the dip tube 114 and the output pipe 116. The output pipe 116 extends through the top surface 124 to a predetermined distance from the bottom surface 126. This predetermined distance may be fairly close to the top surface 124. Having the output pipe 116 close to the top surface 124 allows the hotter water, which may be the hottest water in the tank 102, to exit the tank 102 upon demand. In operation, when the hot water is demanded, fresh water flows into the dip tube 114 to the bottom of the tank 102 and pushes or otherwise causes the hotter water at the top of the tank 102 to exit through the output pipe 116.

Like the output pipe 116, the dip tube 114 extends through the top surface 124 to a predetermined distance from the bottom surface 126. This predetermined distance may be fairly close to the bottom surface 126. Having the exit of the dip tube 114 close to the bottom surface 126 allows the cold or ambient water to enter the tank 102 near the bottom surface 126. This prevents the cold or ambient water from mixing and cooling the hotter water near the top surface 124. In practice, the dip tube 114 may be typically located about three quarters of the distance from the top surface 124 to the bottom surface 126. Because the water entering the tank 102 is denser than the heated water, this water sinks to the bottom of the tank 102, where it may be heated.

The heater 108 heats the water inside the tank 102. The heater 108 may be a gas-fired heater, an electric heater, a plurality of gas-fired burners, a plurality of electric heaters, a combination of gas-fired and electric heaters, or any other heat source. When called upon, the heater 108 may provide a small amount of heat, a large amount of heat, or no heat at all.

In the gas-fired water heater 110, the heater 108 may have a gas-flow valve (not shown), a burner 128, and an ignition source 130. The gas-flow valve may be a solenoid-controlled valve, a linear actuated valve, a motor actuated valve, or any other valve capable of supplying gas to the burner 128. The ignition source 130 may be a pilot light, a solid-state igniter, an electric heat element, or any other ignition source capable of igniting gas.

The heat output of the heater 108 may be controlled by burner orifice size, gas pressure, and/or time. To produce heat in the gas-fired water heater 110, gas flows into the burner 128 through the gas-flow valve, where the ignition source 130 ignites the gas. The gas will continue to burn until the supply of gas is terminated.

In an alternative electric water heater embodiment (not shown), the heat output may be controlled by an electric current flow through one or more electric heating elements. Typically, an electric heater has two heating elements—one located in the bottom half of the tank and the other one located in the top half of the tank. To produce heat in the electric water heater, the amount of current impressed on the electric heating element is regulated. In regulating the heat output, the more current impressed on the electric heating element, the more heat is produced. Conversely, less or no heat is produced if the current is reduced or turned off, respectively. Typically, a temperature sensing device, such as a thermostat or a temperature sensor, is located near each heating element.

The water heater 110 also includes a controller 132, a top sensor 134, a bottom sensor 136, and a gas-flow-valve actuator 138. The controller 132 may include a set of relay logic modules, a processor, and programmable instructions for producing an output to actuate the gas-flow valve actuator 138. As those skilled in the art will recognize, the controller 132 may have other alternative constructions as well. Details of an example controller are provided in U.S. Pat. No. 6,959,876 titled "Method and Apparatus for Safety Switch," which is assigned to the same assignee as the current application. U.S. Pat. No. 6,959,876 is hereby incorporated by reference in its entirety.

The controller 132 receives signals from the top and bottom sensors 134, 136. Based on those signals, the controller 132 may produce an output to initiate a heat cycle. During the heat cycle, the controller 132 actuates the gas-flow-valve actuator 138, which in turn opens the gas-flow valve to supply gas to burner 128. When gas is supplied to the burner 128, the controller 132 triggers the ignition source 130 to ignite the gas, if the ignition source 130 requires such trigger.

The burner 128 then burns the gas until the demand for heat ceases. Once the heat demand ceases, the controller 132 may produce a second output. This second output, in turn, deactivates the gas-flow-valve actuator 138, thereby shutting off the gas supply and dampening the firing of the burner 128.

The top sensor 134 may be a temperature sensor or another device capable of sensing water temperature near the top of the tank 102. Thus, for example, a sensor capable of detecting a property of the water from which the water temperature may be derived (such as pressure) may also be used with the present system. Preferably, the top sensor 134 may be located towards the top surface 124 near the exit opening in the output pipe 116. However, the top sensor 134 need not be physically located at the top of the water heater 110, provided that the temperature of the water near the top is detected by the top sensor 134. In practice, the top sensor 134 may be located about 4 to 8 inches from the top surface 124.

The top sensor 134 may provide to the controller 132 signals related to the detected water temperature. Alternatively, top sensor 134 may also incorporate switches and logic modules so as to provide the controller 132 with signals that relate to the detected water temperature. For instance, in response to the top sensor 134 detecting a hot water temperature that is over a given threshold, one or more of such logic modules may cause one of the switches to open or close, thereby signaling the controller 132 that the hot water temperature is over the given threshold. Further, the logic modules may keep the switch in that position so long as the detected temperature is over the given threshold.

Like the top sensor 134, the bottom sensor 136 may be a temperature sensor or another device capable of sensing water temperature near the bottom of the tank 102. Preferably, the bottom sensor 136 may be located towards the bottom surface 126 and towards the exit of the dip tube 114. The bottom sensor 136, however, need not be located in such position. Rather, all that is required is that the bottom sensor 136 be able to sense the water temperature near the bottom of the tank 102.

Like the top sensor 134, the bottom sensor 136 may provide to the controller 132 signals related to the detected water temperature. Alternatively, the bottom sensor 136 may also incorporate switches and logic modules so as to provide the controller 132 signals related to the detected water temperature.

The gas-flow-valve actuator 138 controls the amount of heat delivered by the heater 108. The gas-flow-valve actuator 138 controls the opening and closing of the gas-flow valve. When heat is called for, the gas-flow-valve actuator 138 opens the gas-flow valve, which allows gas to flow into the burner 128. When the controller 132 sends the gas-flow-valve actuator 138 an indication to stop the gas flow, it closes the gas-flow valve, thereby causing cessation of gas and, in turn, heat.

Energy Savings Algorithm

The general operation of the water heater 110 described above is controlled by the controller 132. The controller 132 controls the heater 108 using a standard algorithm based on inputs received from the two sensors 134, 136. An energy savings algorithm may be used to modify the inputs to the standard algorithm to make the water heater 110 more energy efficient, resulting in lower operational costs.

One or more of the energy savings solutions described below may be used to reduce user complaints of cold water. For example, using one or more of a variable setpoint differential, a variable setback threshold, additional setback thresholds, and an adjustable minimal setpoint may improve the operation of an energy efficient water heater. Additionally or alternatively, a different setback control algorithm may be used.

The energy savings algorithm may initially determine whether the water heater 110 is to operate in an energy savings mode. A user of the water heater 110 or another person (e.g., an installation technician) may select whether or not the water heater 110 is to operate in the energy savings mode. Alternatively, the water heater 110 may be preprogrammed to operate only in the energy savings mode or in the standard mode (i.e., not in the energy savings mode).

Variable Setpoint Differential

Figure 2:
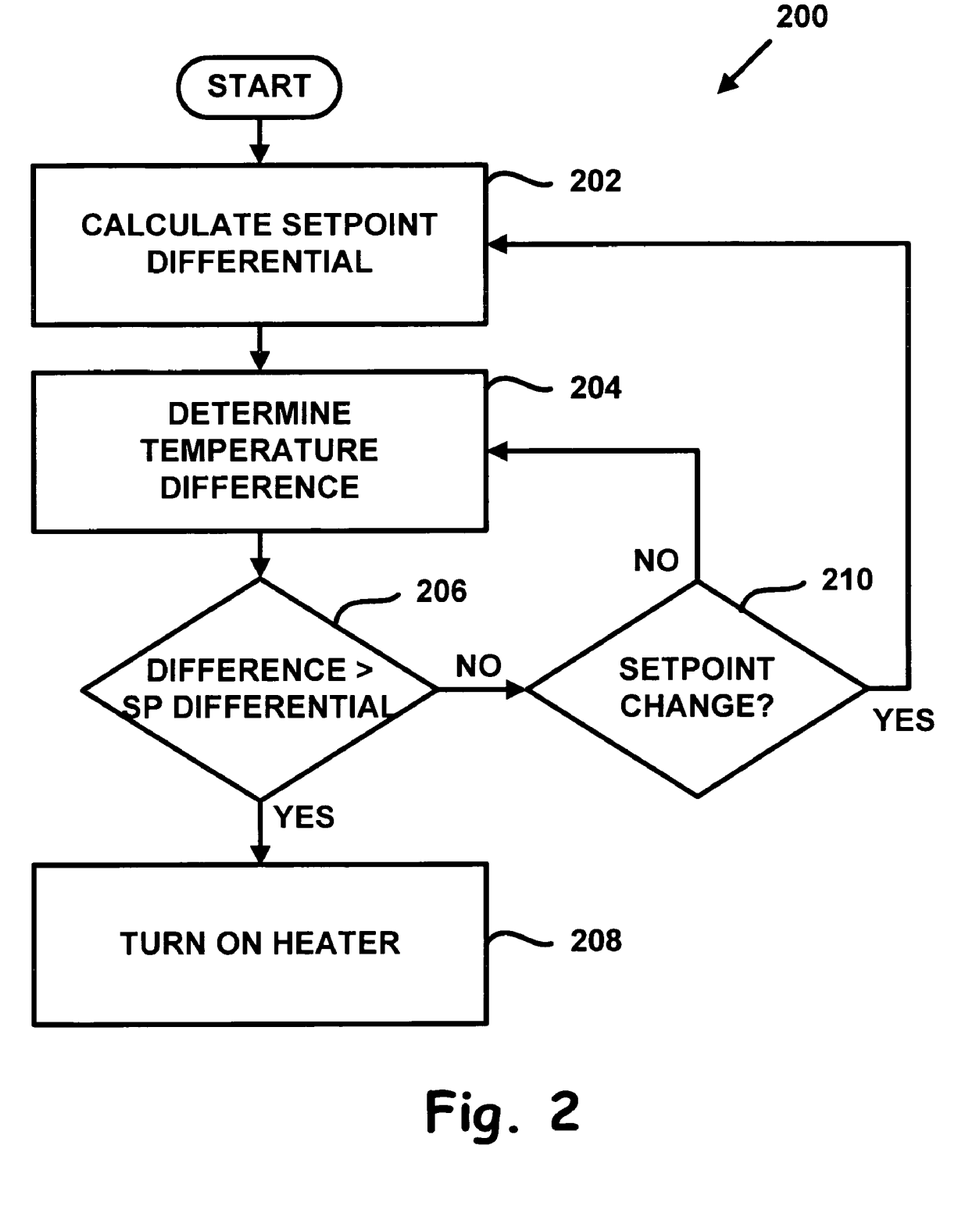
FIG. 2 is a flow chart of a portion of an energy savings algorithm including a variable setpoint differential, according to an example.

FIG. 2 is a flow chart 200 of a portion of an energy savings algorithm including a variable setpoint differential. The setpoint differential is the hysteresis in the control algorithm, i.e., the burner shuts off at the setpoint and turns back on at the setpoint minus the setpoint differential. The energy savings algorithm may operate using a variable setpoint differential as a function of setpoint.

The water heater 110 may sit idle for a long period of time and not reheat until the difference between the temperatures sensed at the top sensor 134 and at the bottom sensor 136 are below the setpoint minus the setpoint differential threshold value. Previously, energy savings algorithms used a fixed setpoint differential, such as ten degrees Fahrenheit. However, a fixed value may cause cold water complaints at lower setpoints if the differential is too large. Additionally, a small differential at higher setpoints may cause excessive cycling of the heater 108 when the water heater 110 is not being used.

At block 202, the setpoint differential is calculated as a function of setpoint. By using a variable setpoint differential as a function of setpoint, cold water complaints may be reduced. At lower setpoints, the setpoint differential may be reduced to provide water at a more constant water temperature. At higher setpoints, idle cycling may be reduced without a noticeable loss of performance.

In one example, the setpoint differential may be calculated as:

$$SPD = SPD_{min} + (SP - SP_{min})/4 * K \quad \text{(Equation 1)}$$

where SPD is the setpoint differential; $SPD_{min}$ is the minimum setpoint differential; SP is the setpoint; $SP_{min}$ is the minimum setpoint; and K is a variable. For example, K may be a value based on the setpoint differential increase per every three degrees of setpoint. Other methods of calculating the variable K may also be used. Additionally, other formulas may also be used to calculate a variable setpoint differential.

At block 204, the controller 132 determines the temperature difference between the average of the temperatures detected at the top and bottom sensors 134, 136 and the setpoint. At block 206, the temperature difference determined at block 204 is compared to the setpoint differential calculated at block 202. If the difference is greater than the setpoint differential, the heater 108 is activated.

If the difference is not greater than the setpoint differential, at block 210 the controller determines whether the setpoint has changed. If the setpoint has not changed, the energy savings algorithm returns to block 204 to determine the current temperature difference between the average of the temperatures at the top and bottom sensors 134, 136 and the setpoint. However, if the setpoint has changed, the energy savings algorithm returns to block 202 to recalculate the setpoint differential based on the current value of the setpoint.

Variable Setback Threshold

Figure 3:
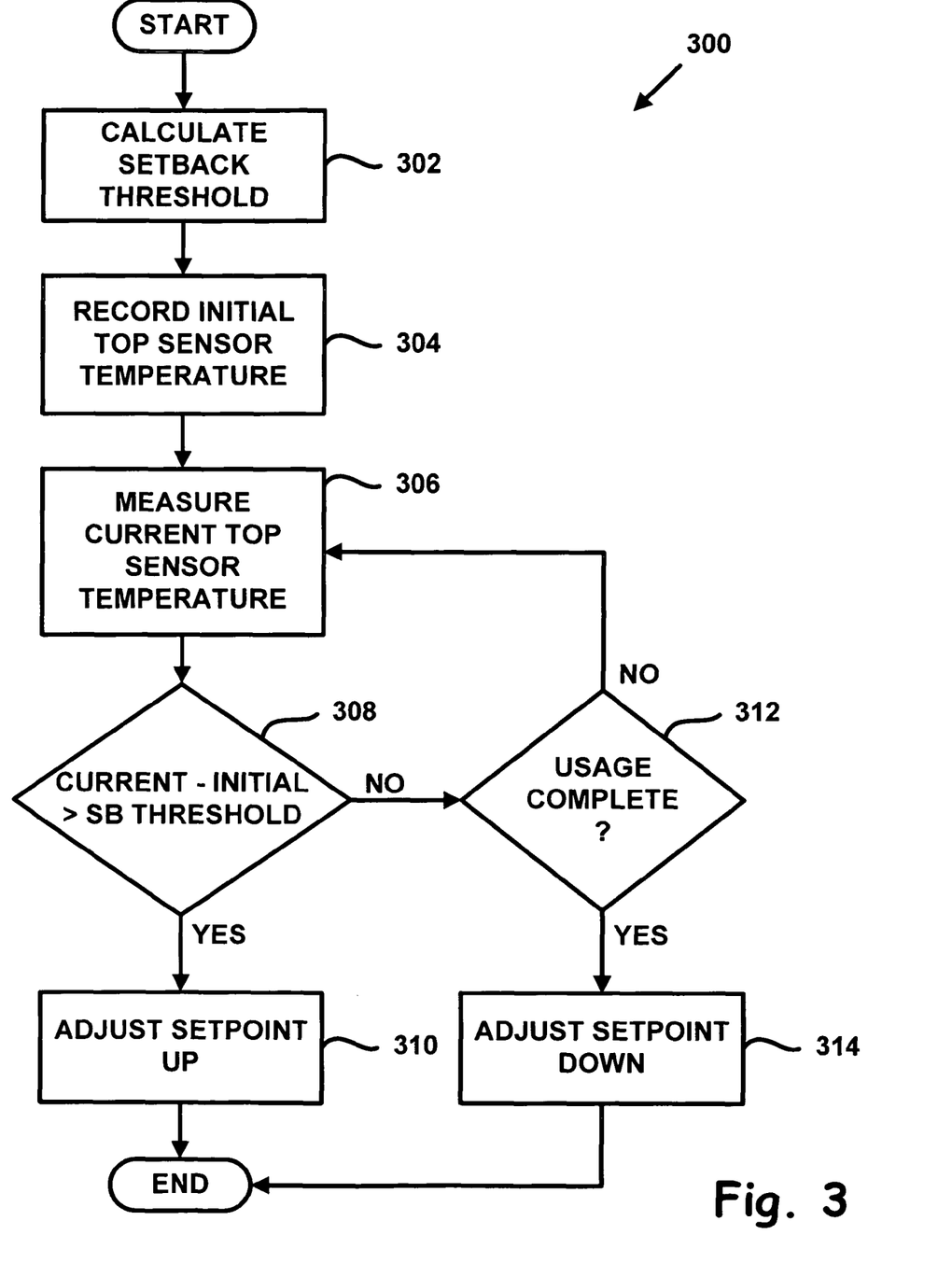
FIG. 3 is a flow chart of a portion of an energy savings algorithm including a variable setback threshold, according to an example.

FIG. 3 is a flow chart 300 of a portion of an energy savings algorithm including a variable setback threshold. When the burner 128 is on, the top sensor 134 is monitored to determine whether readings from the top sensor 134 have decreased greater than a setback threshold. A variable setback threshold may be used for this determination. Additionally or alternatively, the top sensor 134 may be monitored when water usage is detected. The water usage may be monitored because usage may be sensed before the burner 128 is activated.

Previously, a fixed setback threshold was used regardless of water temperature. For example, the fixed setback threshold may be a ten degree Fahrenheit drop in temperature. However, the amount of usage to drop ten degrees Fahrenheit at a high temperature (e.g., 150° F.) is much greater than the usage to drop ten degrees Fahrenheit at a low temperature (e.g., 115° F.). By using a variable setback threshold, a more accurate estimate of the true usage from the water heater 110 may be achieved. The setback threshold may be generally reduced for lower setpoints, similar to decreasing the setpoint itself.

At block 302, the setback threshold is calculated. The setback threshold may be calculated in a similar manner as the variable setpoint differential as described with reference to FIG. 2. For example, the setback threshold may be calculated as:

$$SBT = SBT_{min} + (SP - SP_{min})/J \quad \text{(Equation 2)}$$

where SBT is the setback threshold; $SBT_{min}$ is the minimum setback threshold; SP is the setpoint; $SP_{min}$ is the minimum setpoint; and J is a variable. For example, J may be a value based on the setback threshold increase per every degree of setpoint. Other methods of calculating the variable J may also be used. Additionally, other formulas may also be used to calculate a variable setpoint differential.

At block 304, the controller 132 records an initial temperature at the top sensor 134. At block 306, the controller 132 measures the current temperature at the top sensor 134. At block 308, the temperature difference between the initial temperature measured at block 304 and the current temperature measured at block 306 is compared to the setback threshold calculated at block 302. If the temperature difference at the top sensor 134 exceeds the setback threshold, then at block 310 the setpoint is increased. Preferably, the setpoint is increased by three degrees Fahrenheit without exceeding the initial setpoint. However, other adjustments to the setpoint may be performed.

However, if the temperature difference at the top sensor 134 is less than the setback threshold, the controller 132 determines whether water usage is complete at block 312. If water usage continues, the energy savings algorithm returns to block 306 to continue monitoring the current temperature at the top sensor 134. Otherwise, at block 314, the setpoint is reduced.

Additional Setback Thresholds

At block 302, more than one setback threshold may be calculated and used. Previously, only a single setback threshold was used that stepped the setpoint up or down every main burn cycle. As a result, the typical energy savings algorithm was never satisfied. By using addition setback thresholds, a third state—unchanged—is available. By having three states (i.e., step up, step down, and unchanged), the energy savings algorithm may be satisfied, providing a more stable operating setpoint.

Figure 4:
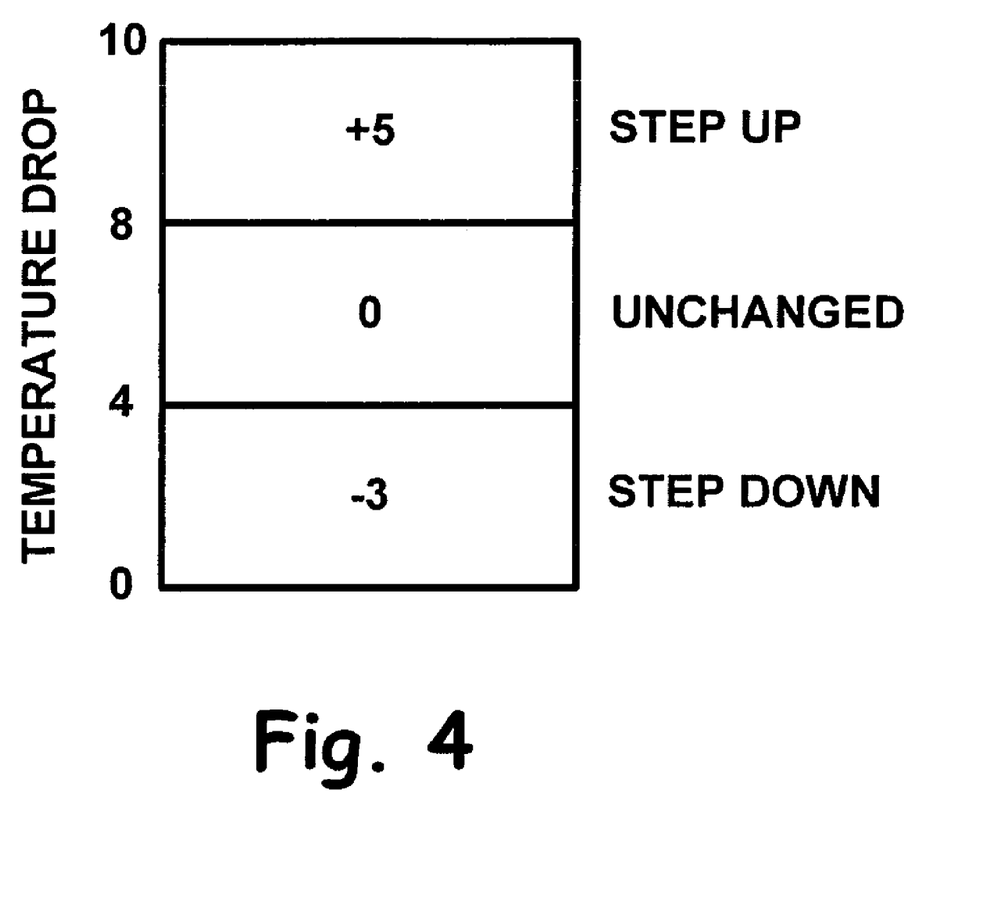
FIG. 4 is a chart that depicts setpoint change as a function of upper temperature drop, according to an example.

FIG. 4 is a chart depicting setpoint change as a function of the temperature drop at the top sensor 134. As seen in FIG. 4, the setpoint change is −3 degrees Fahrenheit (i.e., step down) if the temperature at the top sensor 134 drops less than 4 degrees and the setpoint change is +5 degrees Fahrenheit (i.e., step up) if the temperature at the top sensor 134 drops more than 8 degrees. However, the setpoint is not changed if the temperature at the top sensor 134 drops 4-8 degrees. FIG. 4 is provided as an example only, and the setpoint change can vary with respect to the temperature drop at the top sensor 134.

Adjustable Minimal Setpoint

Figure 5:
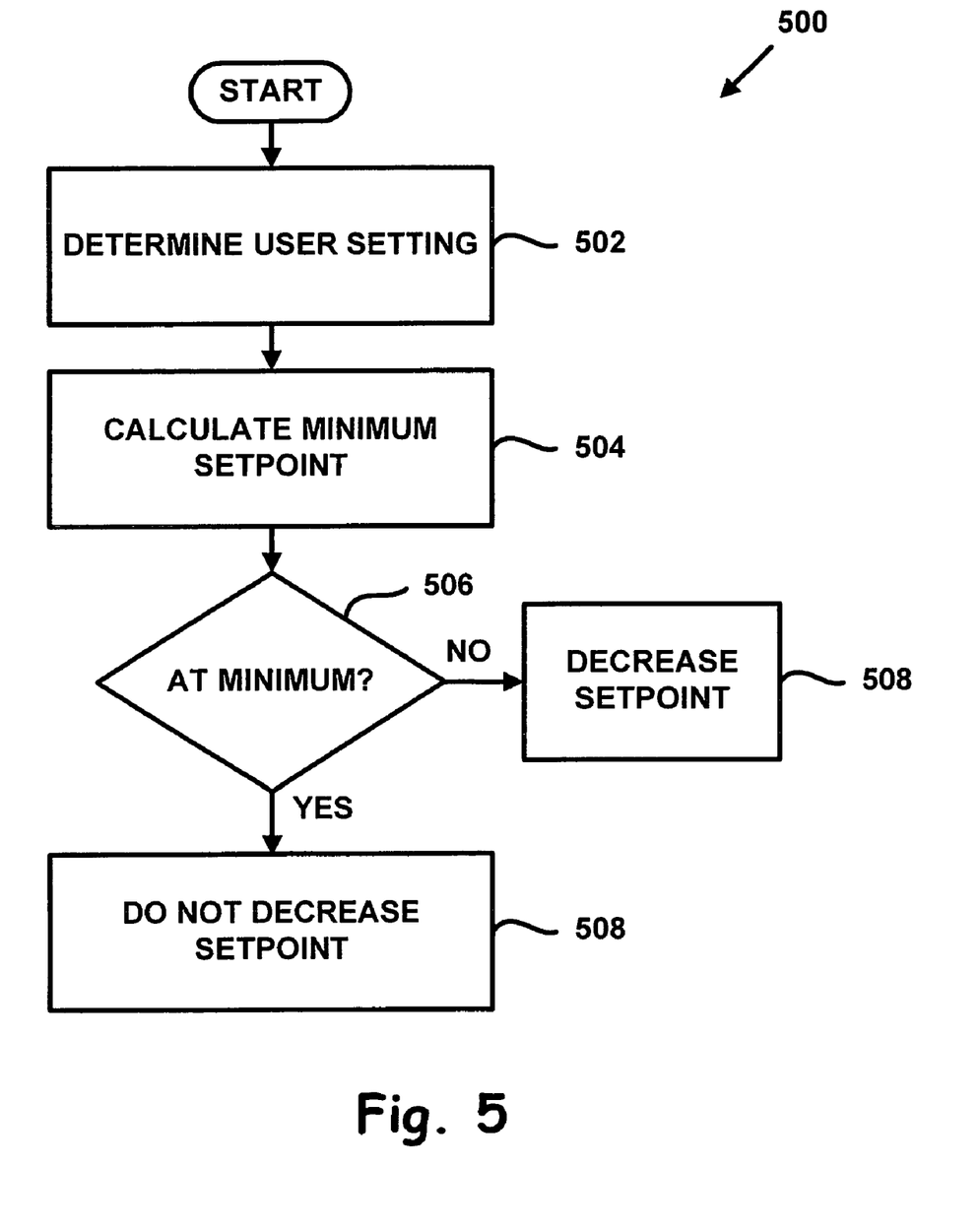
FIG. 5 is a flow chart of a portion of an energy savings algorithm including an adjustable minimal setpoint, according to an example.

FIG. 5 is a flow chart 500 of a portion of an energy savings algorithm including an adjustable minimal setpoint. At block 314, the setpoint may be decreased. Preferably, the setpoint is decreased by two degrees Fahrenheit without falling below the minimum setpoint. Previously, the minimum setpoint was fixed. For example, the setpoint may be decreased by two degrees Fahrenheit until the fixed minimum setpoint of 115 degrees Fahrenheit was reached. If the user decided that the water is too cold and turned a control knob to a higher setting, the setpoint initially adjusted to the new user setting, but eventually the typical energy savings algorithm stepped back to the same minimum setting as before the user's action.

By providing an adjustable minimal setpoint based on the user's setting (i.e., knob setpoint), cold water complaints may be reduced. As the knob setpoint is increased, the minimum setpoint is also increased. For example, the minimum setpoint may be calculated as:

$$SP_{min} = Knob_{min} + (Knob_{current} - Knob_{min})/2 \quad \text{(Equation 3)}$$

where $SP_{min}$ is the minimum setpoint; $Knob_{min}$ is the user's minimum setting; and $Knob_{current}$ is the user's current setting. In this example, the minimum setpoint may be half the distance between the current and the minimum setpoint. Other formulas may also be used to calculate an adjustable minimal setpoint.

At block 502, the controller 132 determines the user's setting. At block 504, the minimum setpoint is calculated based on the user's setting determined at block 502. At block 506, the controller determines if the setpoint is already at the minimum setpoint determined at block 504. If the setpoint is already at the minimum setpoint, at block 508 the setpoint is not decreased. Otherwise, at block 510, the setpoint is decreased. The energy savings algorithm may implement the flowchart 500 whenever the setpoint is decreased, such as when the setpoint is decreased at block 314 as depicted in FIG. 3.

Setback Control Algorithm

As described with respect to FIGS. 2-5, changes can be made to the typical energy savings algorithm to reduce user complaints of cold water. Additionally or alternatively, a different setback control algorithm 600 depicted in FIG. 6 may be used. In this example, the controller 132 obtains additional data to adjust the setpoint. At block 602, data from both the top and bottom sensors 134, 136 is used together to track the typical minimum available hot water in the tank 102 over longer periods of time. For example, the data may be tracked for one-day periods.

Figure 6:
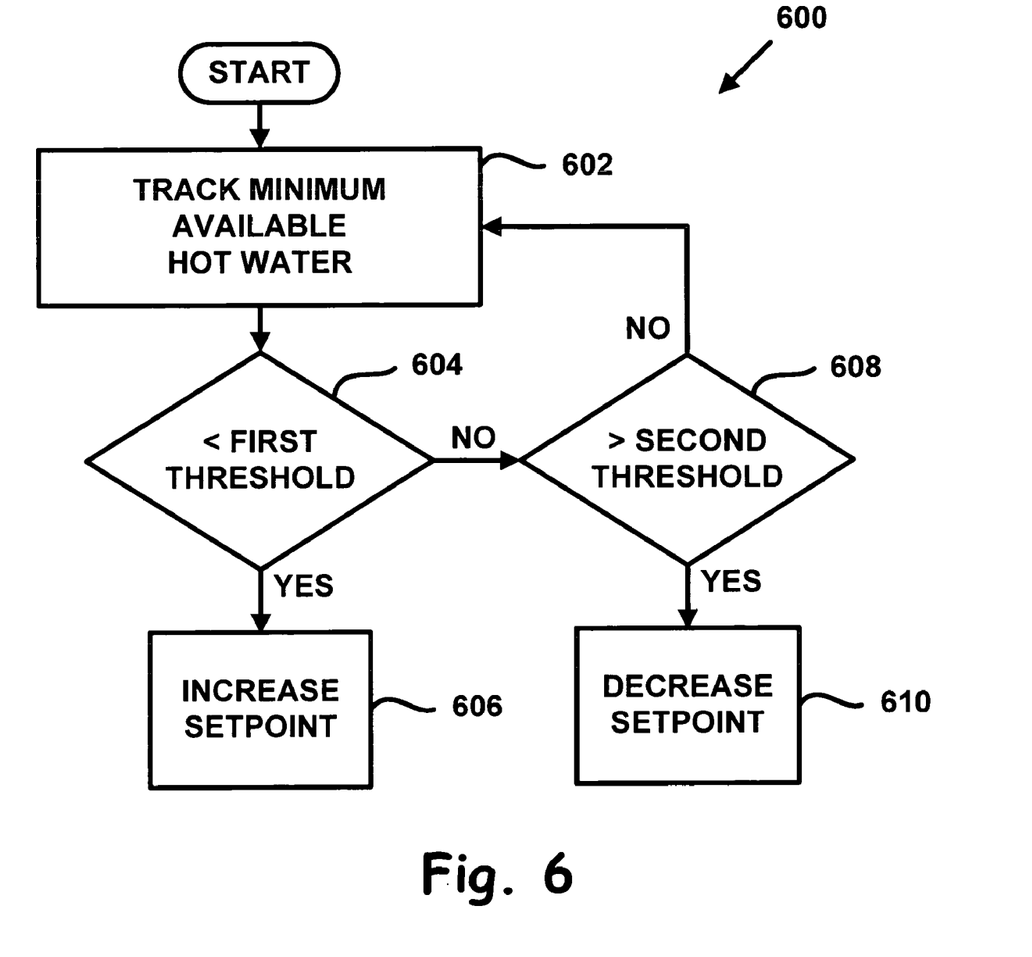
FIG. 6 is a flow chart of a portion of a setback control algorithm, according to an example.

At block 604, the minimum available hot water is compared to a predetermined first threshold. If the minimum available hot water drops below the first threshold, at block 606 the setpoint can be increased to allow, on average, more hot water. The first threshold may be predetermined by design, or adjusted by a user or other person when setting the water heater 110. Otherwise, the minimum available hot water may be compared to a predetermined second threshold at block 608.

If the minimum available hot water is always (or nearly always) above the second threshold, at block 610 the setpoint may be decreased to further save otherwise wasted energy. The second threshold may be higher than the first threshold by a reasonable amount. Otherwise, the setback algorithm may return to block 602 to continue tracking the minimum available hot water in the tank 102.

As described, a water heater may be controlled to run more efficiently and reduce customer cold water complaints. By implementing an energy savings algorithm that uses one or more of a variable setpoint differential, a variable setback threshold, additional setback thresholds, and an adjustable minimal setpoint, the available hot water in the water heater may be increased when needed to accommodate usage. Additionally or alternatively, a different setback control algorithm may be used that obtains additional data to adjust the setpoint.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A water heater system, comprising in combination:
a tank for holding water;
at least one heater for heating water in the tank; and
a controller, wherein the controller calculates a minimum temperature setpoint of the at least one heater as a function of both a current user setting and a minimum temperature setting, wherein the current user setting is a temperature value that is input by the user, and wherein the function comprises increasing the minimum temperature setpoint as the current user setting is increased, thereby establishing the minimum temperature setpoint as the minimum water temperature, wherein the controller adjusts the minimum temperature setpoint of the at least one heater based on the following equation:

$$SP_{min} = Knob_{min} + (Knob_{current} - Knob_{min})/2$$

where $SP_{min}$ is the minimum temperature setpoint; $Knob_{min}$ is the minimum temperature setting; and
$Knob_{current}$ is the current user setting.

* * * * *